(12) United States Patent
Kinukawa

(10) Patent No.: US 6,328,504 B1
(45) Date of Patent: Dec. 11, 2001

(54) PLUNGE-CUTTING FORMING TIP

(75) Inventor: Tatsuji Kinukawa, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/534,023

(22) Filed: Mar. 24, 2000

(30) Foreign Application Priority Data

Mar. 26, 1999 (JP) .................................. 11-084788

(51) Int. Cl.⁷ .............................. B23B 5/48; B23B 27/22
(52) U.S. Cl. .......................... 407/114; 407/70; 407/116
(58) Field of Search .................... 407/114, 115, 407/116, 117, 70, 120

(56) References Cited

U.S. PATENT DOCUMENTS

| | | | |
|---|---|---|---|
| 4,214,845 | * 7/1980 | Mori ..................................... | 407/114 |
| 4,273,480 | * 6/1981 | Shirai et al. ......................... | 407/114 |
| 4,832,541 | 5/1989 | Noguchi et al. . | |
| 5,282,703 | * 2/1994 | Itaba et al. .......................... | 407/114 |
| 5,725,334 | 3/1998 | Paya . | |

FOREIGN PATENT DOCUMENTS

| | | | |
|---|---|---|---|
| 0 775 544 A1 | 5/1997 | (EP) . | |
| 0135104 | * 7/1985 | (JP) .................................... | 407/114 |
| 2548867 | 5/1997 | (JP) . | |

OTHER PUBLICATIONS

European Search Report, No. EP 00 30 2368, dated Jul. 14, 2000.

* cited by examiner

Primary Examiner—Henry Tsai
(74) Attorney, Agent, or Firm—Sughrue, Mion, Zinn, Macpeak & Seas, PLLC

(57) ABSTRACT

A plunge-cutting forming tip which improves chip disposal. A protrusion (11) is disposed on a rake face (7) in the vicinity of the ridgeline of a plunge-cutting edge (3). In cutting by means of the tip (1), a chip (K) is ejected which is not only merely thin, but also is ejected in such a manner as to be partially squeezed as a result of pressing against the protrusion (11). Accordingly, the chip is ejected such that a cross section thereof is deformed into a channel shape instead of assuming a flat shape. Thus, the rigidity of the chip is increased, so that chip disposal is improved accordingly.

19 Claims, 9 Drawing Sheets

PLUNGE-CUTTING FORMING TIP

BACKGROUND OF THE INVENTION

1. Field of the Invention

The present invention relates to a cutting tip, and particularly to a plunge-cutting forming tip (for use with a turning tool; hereinafter the forming tip may be referred to merely as a tip) for plunge cutting while transferring onto a workpiece the contour (ridgeline) of a cutting edge.

2. Description of the Related Art

A circumferential surface of a bearing race (an outer circumferential surface of an inner race or an inner circumferential surface of an outer race) is subjected to plunge cutting in turning. A cutting tool is not fed along the axis of rotation of a workpiece (bearing race) during turning, but is fed radially. A plunge-cutting forming tip for use in such cutting differs in the shape of a cutting edge (the shape of a ridgeline of a cutting edge) according to individual type of workpiece, as is understood from the nature thereof.

For example, the plunge-cutting edge of a forming tip disclosed in Japanese Utility Model Application Laid-Open (kokai) No. 4-83503 has a profile to be transferred onto an outer circumferential surface of an inner race (workpiece). The forming tip is pressed against the circumferential surface of the workpiece to thereby plunge-cut, for example, a raceway groove for balls, a seal groove, or a chamfer of the circumferential surface. A chip breaker assuming a concave form is formed on a rake face through grinding so as to break chips produced during turning.

In plunge cutting of a raceway groove of a bearing and circumferential surfaces located at opposite sides of the raceway groove by means of such a forming tip, cutting of raceway groove begins first, followed by cutting of the circumferential surfaces together with the raceway groove. During cutting, the width and number of chips; i.e., the width of a cutting edge in contact with the workpiece and the number of points of contact with the workpiece, vary. Further, in general, such cutting produces relatively wide cutting chips and a large cutting force. Therefore, feed is set low, so that chips become relatively thin.

Since the rigidity of such a chip is poor, the direction of ejection of the chip becomes unstable, and thus the ejected chip tends to weave about. Further, the chip is less likely to break off. Accordingly, even when the ejected chip is curled, the chip does not break in an appropriate length. As a result, the chip tends to become excessively long while the direction of ejection of the chip is unstable. Such a chip may become entangled with a workpiece, potentially scratching a cut surface of the workpiece, or may become entangled with a tool or a chuck, potentially interrupting the continuous operation of a machine. Further, chip disposal has been difficult.

Since a chip breaker is formed on such a tip through grinding, the chip breaker fails to appropriately deform a chip. Even when a chip is coiled or coned, the coiled or coned chip hardly breaks and is wound coarsely, thus failing to reduce a volume thereof, with resultant poor chip disposal.

When, for example, a central raceway groove and seal grooves located at opposite sides of the central raceway groove are cut simultaneously by means of a forming tip, a chip is produced in association with cutting of the central raceway groove, and at the same time chips are produced in association with cutting of the seal grooves. Since chips are produced in a plurality of rows, they tend to become entangled with cut surfaces in a complicated manner or to become entangled with each other into the form of a bird's nest. Such entangled chips tend to become entangled with a chuck or to cause breakage of a cutting edge or stoppage of a machine. Thus, the conventional forming tip tends to involve entanglement of chips and chips in large lumps, causing poor chip disposal and impairing cutting efficiency.

SUMMARY OF THE INVENTION

The present invention addresses such a problem involved in turning by means of a forming tip, and an object of the present invention is to provide a cutting tip capable of improving chip disposal.

To solve the above problem, a cutting tip of the present invention is characterized in that a protrusion is disposed on a rake face in the vicinity of the ridgeline of a plunge-cutting edge.

In cutting by means of the plunge-cutting forming tip of the present invention, a chip is ejected which is not only merely thin, but also is ejected in such a manner as to be partially squeezed as a result of pressing against the protrusion. Accordingly, the chip is ejected such that a cross section thereof is deformed into a channel shape instead of assuming a flat shape. Thus, the rigidity of the chip is increased, so that chip disposal is improved accordingly. Preferably, the protrusion is located as close as possible to the ridgeline of the plunge-cutting edge (hereinafter may be referred to merely as "cutting edge"); specifically, is located not farther than 2 mm from the ridgeline. If the protrusion is located in excess of 2 mm from the ridgeline, the temperature of a chip becomes too low to impart effective deformation to the cross section of the chip.

A single protrusion may be disposed in the vicinity of the cutting edge, or a plurality of protrusions may be disposed along the ridgeline of the cutting edge. Through disposition of a plurality of protrusions, a chip assumes a corrugated cross section, thereby further improving its rigidity. When a plurality of protrusions are to be disposed on the rake face in the vicinity of and along the ridgeline of the plunge-cutting edge, the protrusions may be disposed substantially symmetrically or asymmetrically with respect to the lateral direction of the rake face. Notably, a lateral side of the rake face corresponds to the side of either end of the ridgeline of the cutting edge. Herein, the term "rear" or "rearward" refers to a direction opposite that of feed in plunge cutting. The term "front" or "frontward" refers to a direction opposite the rearward direction.

When the protrusions are disposed in a laterally symmetrical manner, a chip is ejected rearwardly and is thus readily curled on the rake face into a spiral form, thereby reducing its volume. When the protrusions are disposed in a laterally asymmetrical manner, the direction of ejecting a chip can be controlled accordingly, thereby reducing potential entanglement of chips.

The purpose for disposition of a protrusion is to deform a red-hot chip. Accordingly, a protrusion may assume the form of an independent island or the form of a peninsula extending from the rearward direction toward the ridgeline of the cutting edge. In the case of assuming the form of an independent island, the protrusion preferably assumes a substantially hemispherical form for convenience of manufacture, but may assume any other form. The height and width of protrusion may be selected according to the length of the ridgeline of the cutting edge and the width of the rake face and such that a chip is appropriately squeezed so as to assume a corrugated form.

The present invention is preferably embodied in the form of a tip adapted to cut a bearing race. In any one of the above-described plunge-cutting forming tips of the present invention, the plunge-cutting edge may be embodied in the form of a raceway-groove-cutting edge for cutting a raceway groove in a bearing race, in the form of a seal-groove-cutting edge for cutting a seal groove in a bearing race, or in the form of a combination of the raceway-groove-cutting edge and the seal-groove-cutting edge.

Figure 1:
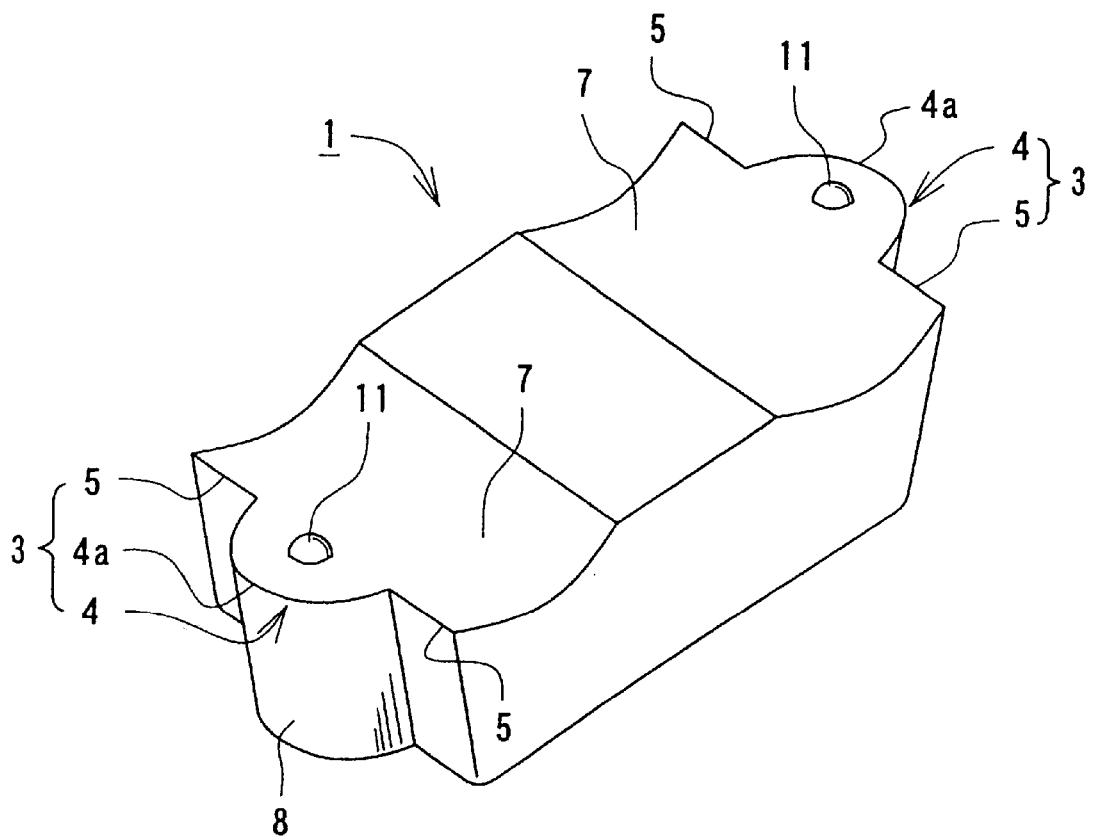
FIG. 1 is a perspective view of a forming tip according to a first embodiment of the present invention.

The present invention will now be explained in more detail by reference to the drawings. However, the present invention should not be construed as being limited thereto.

DESCRIPTION OF THE PREFERRED EMBODIMENTS

First Embodiment:

A forming tip according to a first embodiment of the present invention will be described in detail with reference to FIGS. 1 to 5. Reference numeral 1 denotes a plunge-cutting forming tip according to the first embodiment and adapted to plunge-cut a raceway groove for bearing balls on a circumferential surface of an inner race, which is one of the bearing races, as well as to plunge-cut circumferential surfaces (external circumferential surfaces) located on opposite sides of the raceway groove, in a single step. The tip 1 is made from cemented carbide or cermet.

The tip 1 of the present embodiment is a 2-corner-type throwaway tip having two cutting edges 3 disposed symmetrically and adapted to cut an external circumferential surface of an inner race. The cutting edge 3 includes an arcuate raceway-groove-cutting edge 4 having a predetermined radius of curvature and adapted to cut a raceway groove, and linear cutting edges 5 located at opposite sides of the raceway-groove-cutting edge 4 and adapted to cut the corresponding circumferential surfaces. The cutting edge 3 is formed in a laterally symmetrical manner. One of the cutting edges 3 will be described below. A rake face 7 assumes a concave form in such a manner as to descend rearward at a positive angle of 6 degrees. A front flank 8 has a back clearance angle of 6 degrees.

A protrusion 11 assuming a substantially hemispherical form is disposed on the rake face 7 in the vicinity of a ridgeline 4a of the raceway-groove-cutting edge 4 and substantially at the center of the rake face 7. In the present embodiment, the width of the raceway-groove-cutting edge 4 is approximately 5 mm; the overall width of the cutting edge 3 is 15 mm; the hemispherical protrusion 11 has a diameter D of about 1 mm as viewed from above and a height of 0.3 mm. A distance L1 as viewed from above between the center of the ridgeline 4a and the center of the protrusion 11 is 1.5 mm. The protrusion 11 is integrally formed in a molding step in manufacture of the tip 1. When a positive angle is imparted to the flank 7 as in the case of the present embodiment, the vertex of the protrusion 11 is preferably rendered slightly (for example, 0.1 mm to 0.2 mm) higher than the center of the ridgeline 4a, so as to obtain a great effect of deforming a chip.

Figure 2:
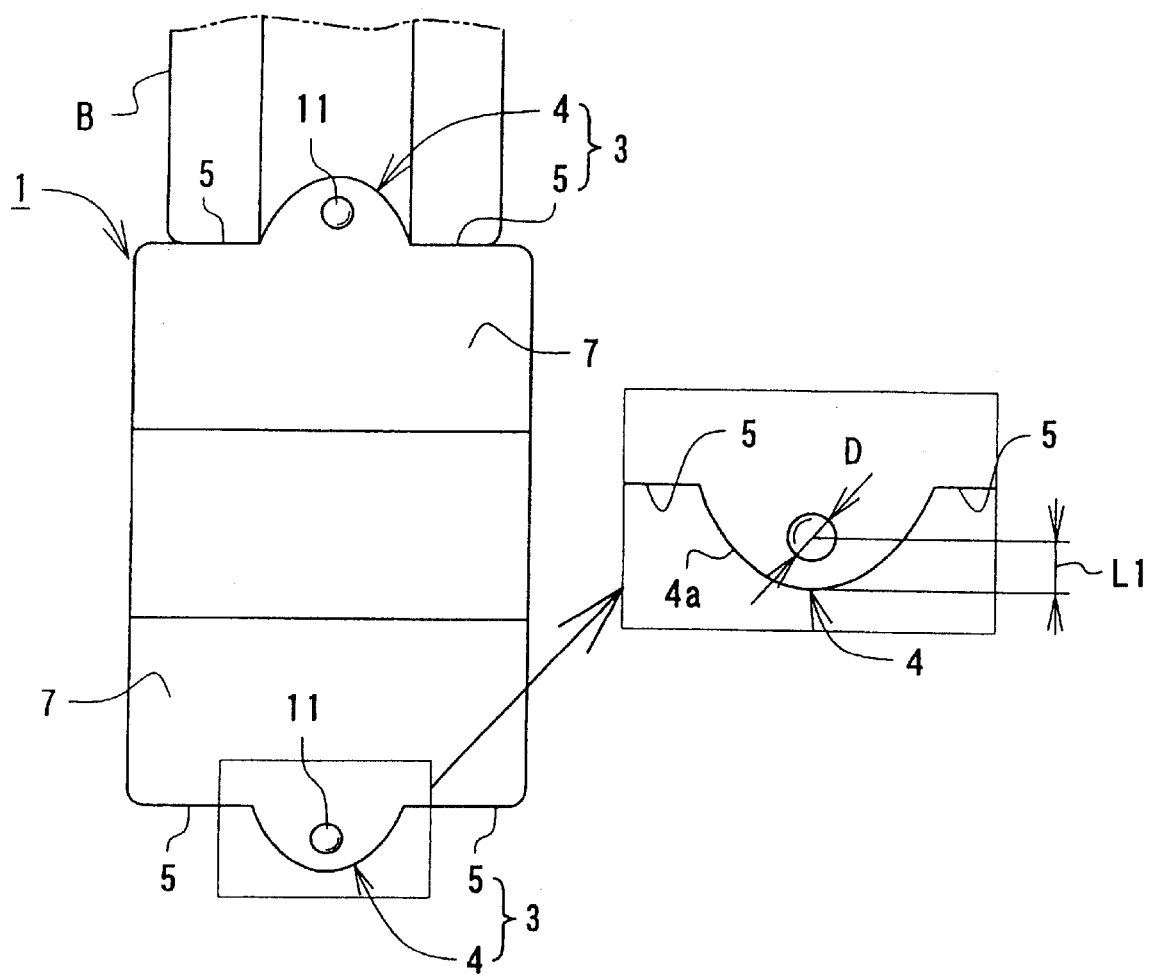
FIG. 2 is a plan view of the tip of FIG. 1 (as viewed from above a rake face) and enlarged view of an essential portion of the tip.
Figure 3:
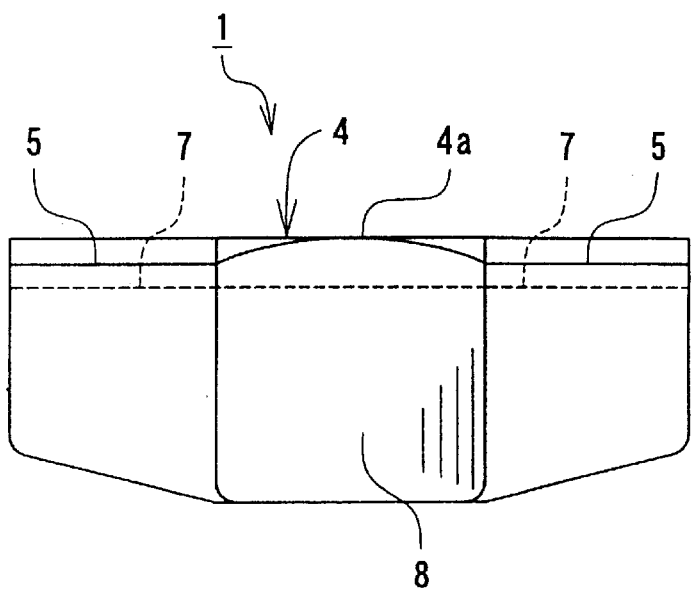
FIG. 3 is a view of the tip of FIG. 1 as viewed from the side of a front flank.
Figure 5:
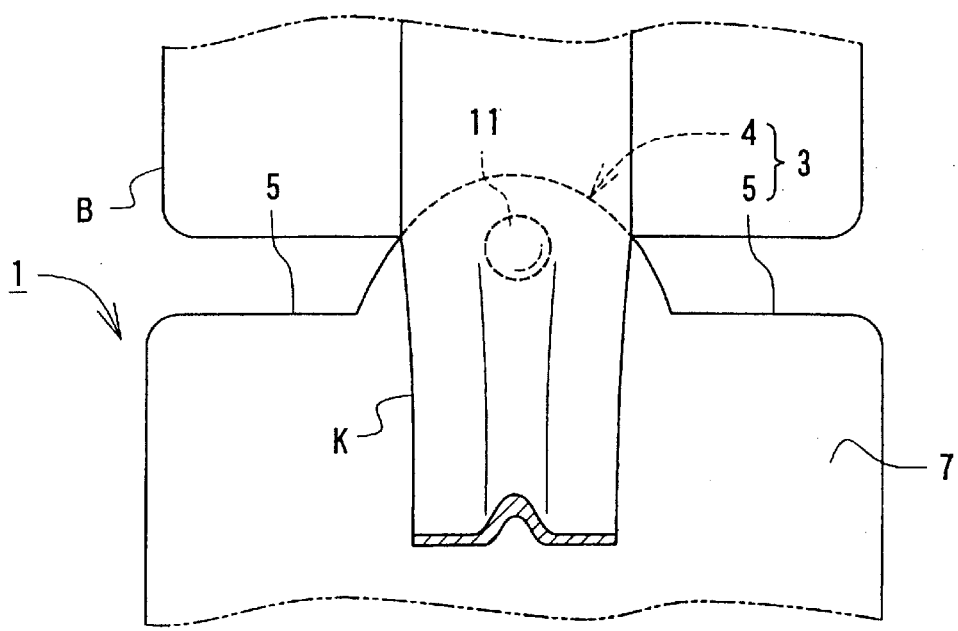
FIG. 5 is an enlarged plan view of an essential portion of the tip of FIG. 1, illustrating cutting of a raceway groove by means of the tip.

The tip 1 of the present embodiment having the above-described structure plunge-cuts the outer circumferential surface of a bearing race (inner race) in the following manner (see FIGS. 2 and 5). When, for example, a bearing race B (also called a workpiece B) is to be subjected to plunge cutting, the tip 1 is fed in the radial direction of the bearing race B to thereby cut a raceway groove by means of the raceway-groove-cutting edge 4, followed by circumferential-surface cutting by means of the linear cutting edges 5.

Figure 4:
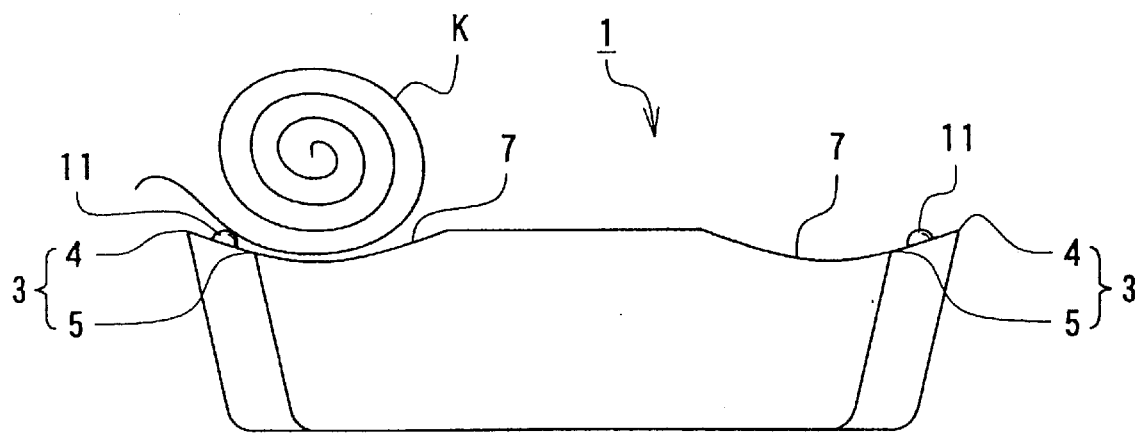
FIG. 4 is a side view of the tip of FIG. 1.

As a result of the above-mentioned plunge cutting, the width of an ejected chip gradually increases. However, since the chip impinges on a front portion of the protrusion 11, the cross section of the chip is deformed into the shape of the letter U as shown in FIG. 5. As a result, the rigidity of the chip is enhanced as compared to a flat chip which is produced in cutting by means of a conventional tip. Since, in the present embodiment, the protrusion 11 is located in a laterally central position, a chip K is ejected straight rearwardly as shown in FIG. 4 and is then curled on the rake face 7 into a spiral form without extending straight in an elongate manner. Thus, the chip K1 does not become entangled with a workpiece and is ejected in a reduced volume, thereby facilitating collection and disposal of the chip K1 and thus improving chip disposal.

Preferably, the distance between the front end of the protrusions 11 and the center of the ridgeline 4a (narrow-width portion of rake face 7: L1–D/2) is 0.1 mm to 2 mm. When the distance is shorter than 0.1 mm, the protrusion 11 become too close to the ridgeline 4a, with a resultant increase in cutting force. When the distance is in excess of 2 mm, sectional deformation (squeeze) of a chip is not effectively performed due to a drop in chip temperature. More preferably, the distance is 0.1 mm to 1 mm. Preferably, a chamfer of about 0.05 mm width (flat land) as viewed from the side of the rake face 7 is imparted to the ridgeline of the cutting edge 3 so as to improve the strength of the cutting edge.

For convenience of manufacture and in view of wear resistance of and prevention of damage to the protrusion 11, the width of the protrusion 11 (the diameter when the protrusion is hemispheric) is preferably 0.2 mm to 2 mm. According to the present embodiment, the protrusion 11 assumes a circular shape as viewed from above. However, the protrusion 11 may assume, as viewed from above, a longitudinally elliptic shape. Alternatively, instead of assuming such an independent island form, the protrusion 11 may assume a peninsular shape extending frontward from a rear portion of the rake face 7.

Second Embodiment:

A tip 21 according to a second embodiment of the present invention will next be described with reference to FIGS. 6 and 7. In the first embodiment, the protrusion 11 is singly disposed on the rake face 7 at the substantial center with respect to the lateral direction of the rake face 7. The second embodiment differs from the first embodiment simply in that protrusions 11a and 11b, 2 pieces each, are disposed on the rake face 7 parallel to the ridgeline 4a of cutting edge. Accordingly, only different features will be described below. The same features are denoted by common reference numerals, and their description is omitted. In the present embodiment, the two protrusions 11b are disposed in a laterally symmetrical manner and more rearward as viewed from above than are the protrusions 11a, which are located laterally more inward than are the protrusions 11b.

Figure 6:
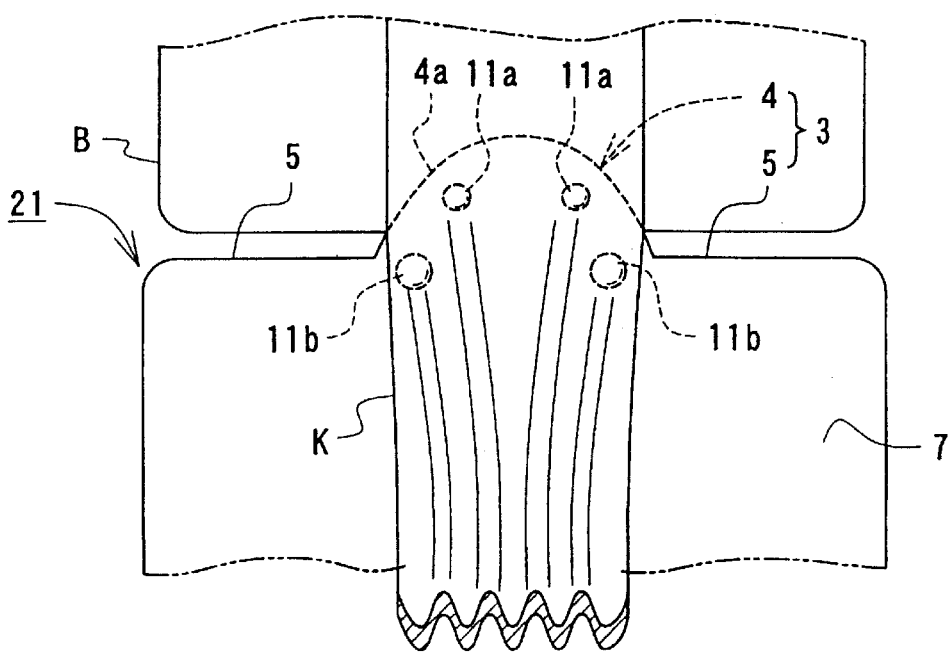
FIG. 6 is an enlarged plan view of an essential portion of a forming tip according to a second embodiment of the present invention, illustrating cutting of a raceway groove by means of the tip.
Figure 7:
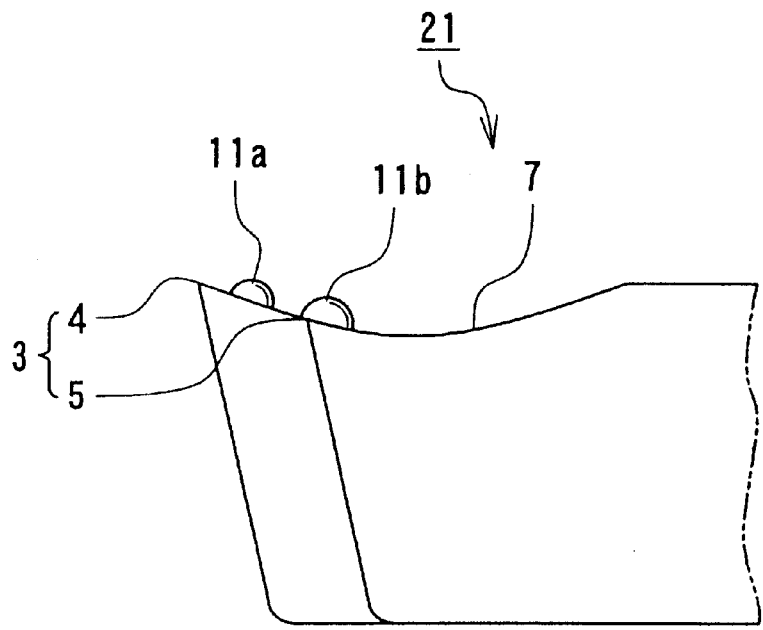
FIG. 7 is a side view of the tip of FIG. 6.

Since the present embodiment employs a plurality of protrusions 11a and 11b, the chip K assumes a corrugated cross section with respect to its width direction as shown in FIG. 6 and is further curled into a spiral form on the rake face 7. The number and interval of protrusions may be selected according to the width of cutting edge and such that the chip K is well deformed. When protrusions are disposed in the longitudinal direction as in the case of the present embodiment, the height of the rear protrusions 11b is preferably higher than that of the front protrusions 11a. According to the present embodiment, protrusions assume a circular shape as viewed from above. However, protrusions may assume, as viewed from above, a longitudinally elliptic shape, or may assume a peninsular shape such that rear portions of the peninsular protrusions merge together (not shown).

Figure 8:
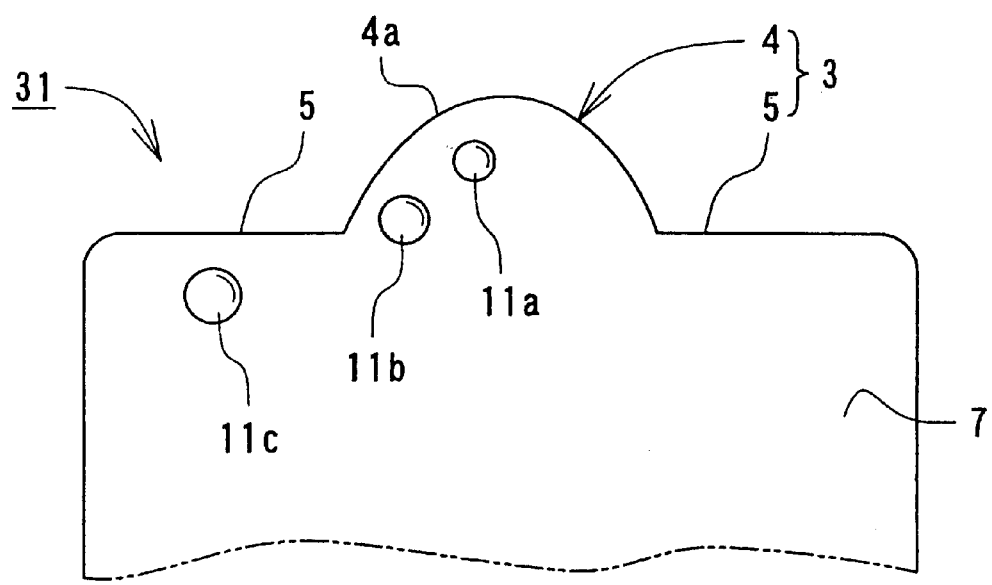
FIG. 8 is an enlarged plan view of an essential portion of a forming tip according to a third embodiment of the present invention.
Figure 9:
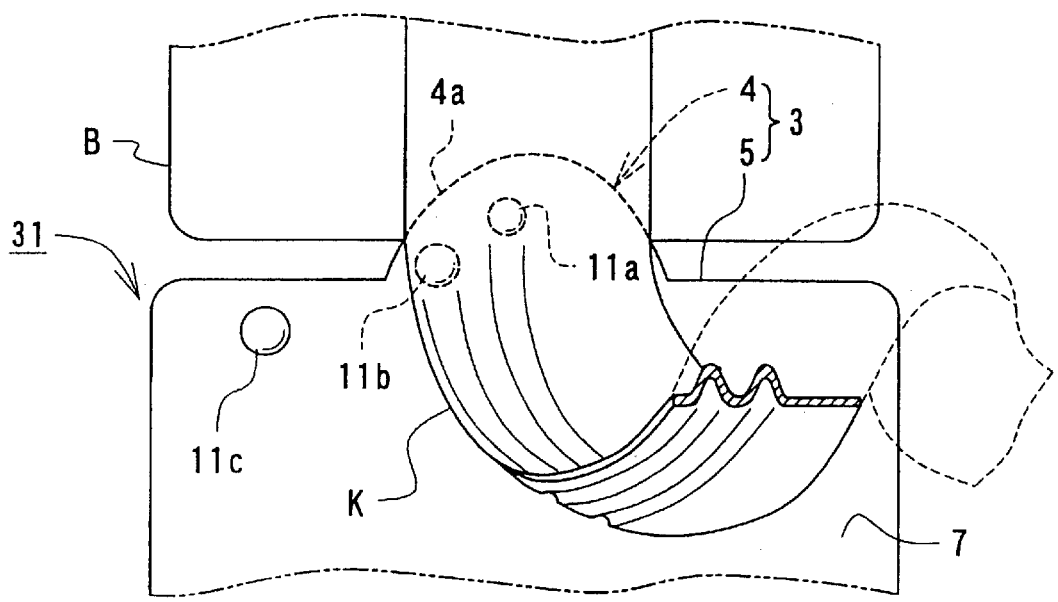
FIG. 9 is an enlarged plan view of an essential portion of the tip of FIG. 8, illustrating cutting of a raceway groove by means of the tip.

Third Embodiment:

A tip 31 according to a third embodiment of the present invention will next be described with reference to FIGS. 8 and 9. In the tip 21 of the second embodiment, a plurality of protrusions 11a and 11b are disposed on the rake face 7 substantially at a laterally central portion and in a laterally symmetrical manner. By contrast, in the tip 31, protrusions 11a, 11b, and 11c are disposed on the rake face 7 in a laterally asymmetrical manner. In the present embodiment, a plurality of (three) protrusions 11a, 11b, and 11c are disposed slantly as viewed from above in the following manner: the foremost protrusion 11a is located slightly leftward with respect to the lateral center; the subsequent protrusions 11b and 11c are located more leftward and rearward in order. When a raceway groove is cut by means of the tip 31, the width of a chip gradually increases. However, since the left-hand portion of the ejected chip K is lifted and corrugated by means of the protrusions which are located leftward with respect to the lateral center in FIG. 9, the chip K assumes a corrugated cross section and is curled such that the radius of the left-hand portion thereof becomes smaller than that of the right-hand portion as shown in FIG. 9. As a result, the chip K is ejected rightward as shown in FIG. 9. Preferably, a rearward protrusion has a greater height.

Thus, through cutting by means of the chip 31, high rigidity is imparted to the chip K. Also, the chip K can be ejected in the form of a coil and in a fixed linear direction. That is, the direction of ejecting a chip can be controlled so as to avoid entanglement, thereby improving chip disposal. The longitudinal interval between protrusions may be determined according to the lateral interval between protrusions, the width of cutting edge, and the direction of chip ejection.

Figure 10:
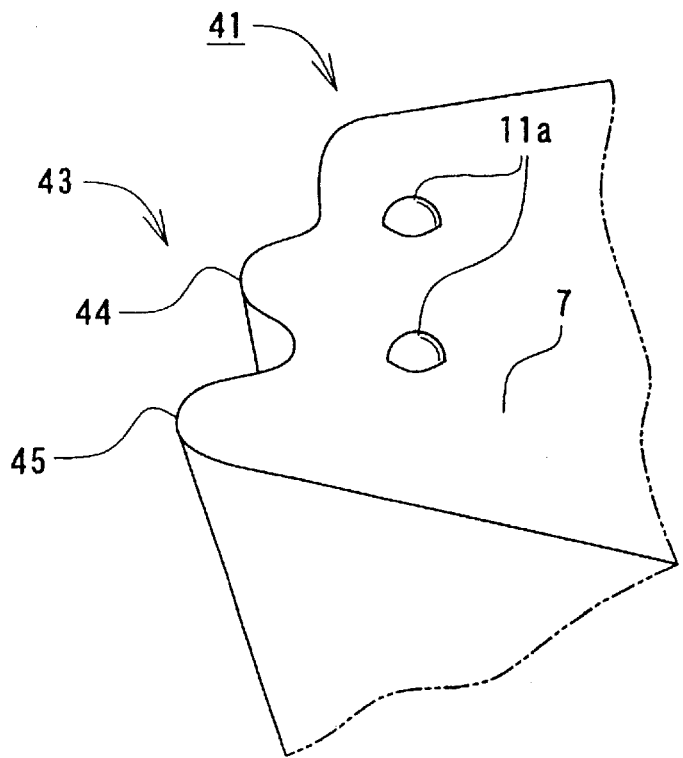
FIG. 10 is an enlarged plan view of an essential portion of a forming tip according to a fourth embodiment of the present invention.
Figure 11:
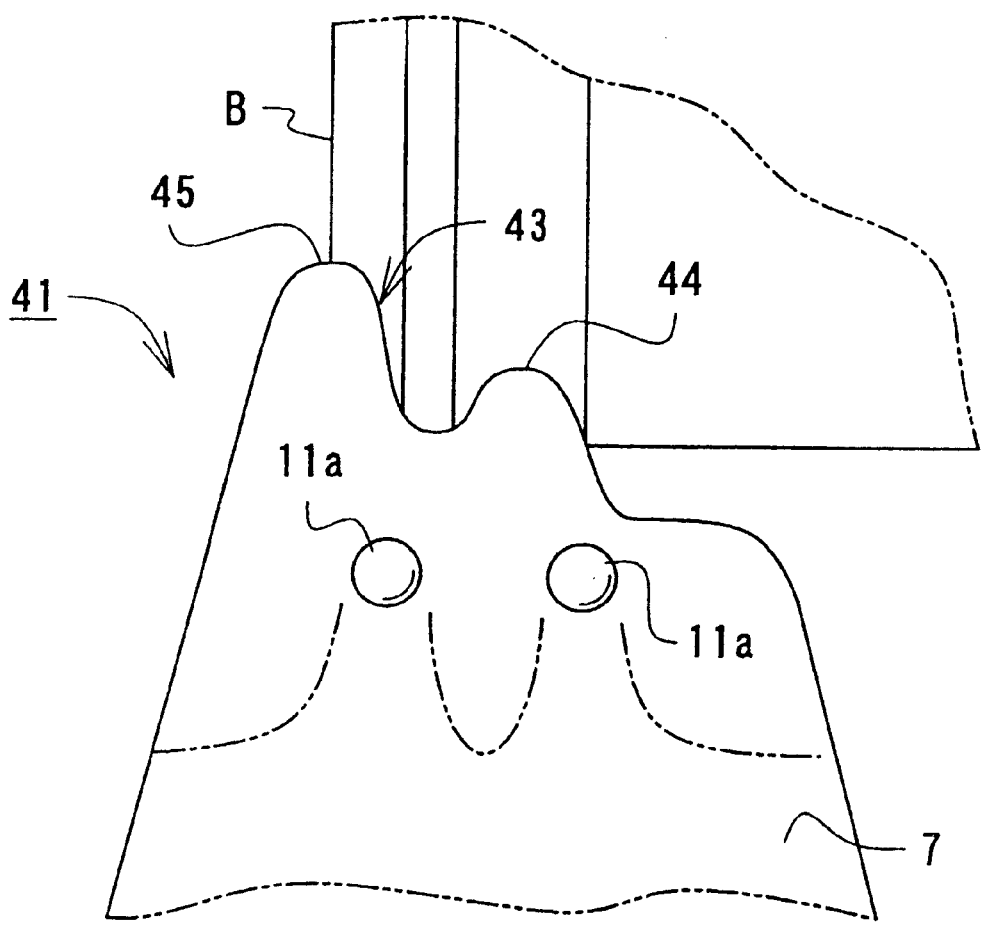
FIG. 11 is an enlarged plan view for explanation of the use of the tip of FIG. 10.

Fourth Embodiment:

A tip 41 according to a fourth embodiment of the present invention will next be described with reference to FIGS. 10 and 11. The tip 41 is substantially identical to the tips of the above-described embodiments except that the tip 41 is adapted to cut a seal groove in a bearing race. Accordingly, only different features will be described, while the same features are denoted by common reference numerals. The tip 41 includes a seal-groove-cutting edge 44 adapted to cut a seal groove while transferring its profile to the seal groove and a chamfering edge 45 for chamfering a workpiece edge (left-hand edge in FIG. 11). The seal-groove-cutting edge 44 and the chamfering edge 45 assume an arcuate form as viewed from above the rake face 7. Two protrusions 11a are disposed on the rake face at a laterally central portion, in parallel with the axis of rotation of a workpiece and substantially in a laterally symmetrical manner.

When a seal groove is plunge-cut in a bearing race by means of the tip 41, a chip (not shown) is deformed by the protrusions 11a disposed on the rake face 7, such that its cross section assumes a corrugated form. Thus, the chip has high rigidity and becomes less entangled. As represented by the two-dot-and-dash line in FIG. 11, the protrusions 11a may assume a peninsular shape.

Fifth Embodiment:

A tip 51 according to a fifth embodiment of the present invention will next be described in detail with reference to FIG. 12. In the tip 41 of the fourth embodiment, a plurality of protrusions are disposed on the rake face 7 substantially at a laterally central portion and in a laterally symmetrical manner. The tip 51 differs from the tip 41 simply in that a plurality of (in the present embodiment, two) protrusions 11a and 11b are disposed on the rake face 7 slantly with respect to the lateral direction. Thus, the same features are denoted by common reference numerals, and only different features will be described. Specifically, in the state of cut shown in FIG. 12, a chip (not shown) is ejected while being first lifted by the right-hand protrusion 11a. Thus, the chip is ejected along the slant array of protrusions 11a and 11b. The chip is deformed by means of the protrusions 11a and 11b such that its cross section assumes a corrugated form, and is ejected straight in a rearward left direction, along the slant.

Figure 12:
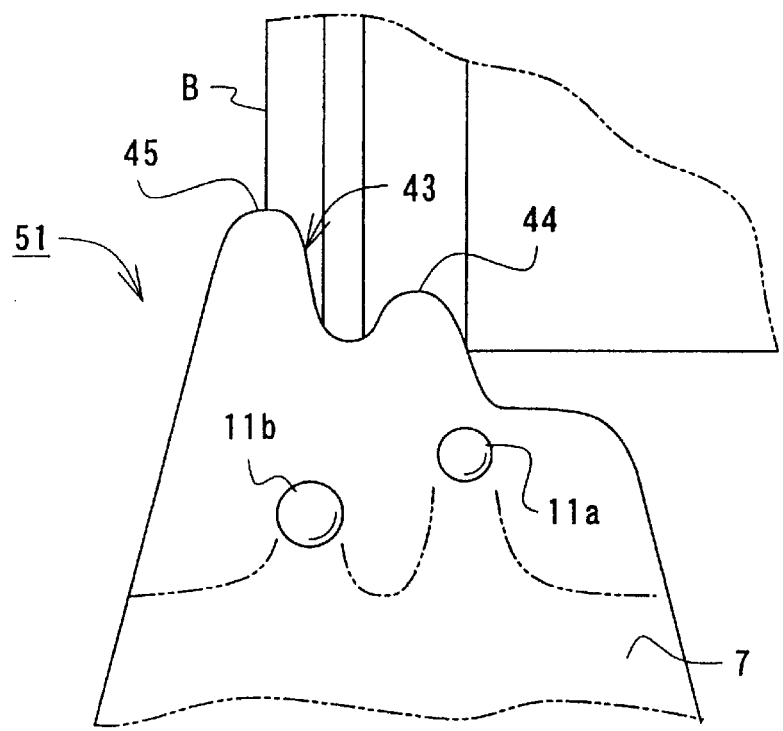
FIG. 12 is an enlarged plan view for explanation of the use of a forming tip according to a fifth embodiment of the present invention.

Notably, when a chip is to be ejected in a certain, leftward or rightward slanted direction, the rake face 7 preferably descends toward the destination of a chip (leftward in FIG. 12). Particularly, when the width of a chip varies as in the case of the present embodiment, the direction of ejecting a chip tends to become unstable. Therefore, through employment of the thus-descending rake face 7, an ejected chip can be effectively directed as desired, thereby exhibiting ejection in a stable direction.

Figure 13:
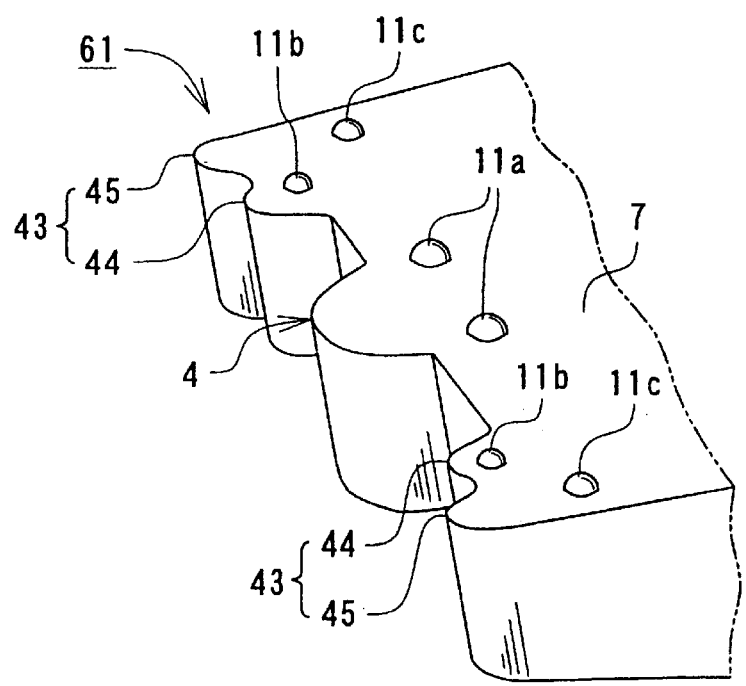
FIG. 13 is an enlarged perspective view of an essential portion of a forming tip according to a sixth embodiment of the present invention.
Figure 14:
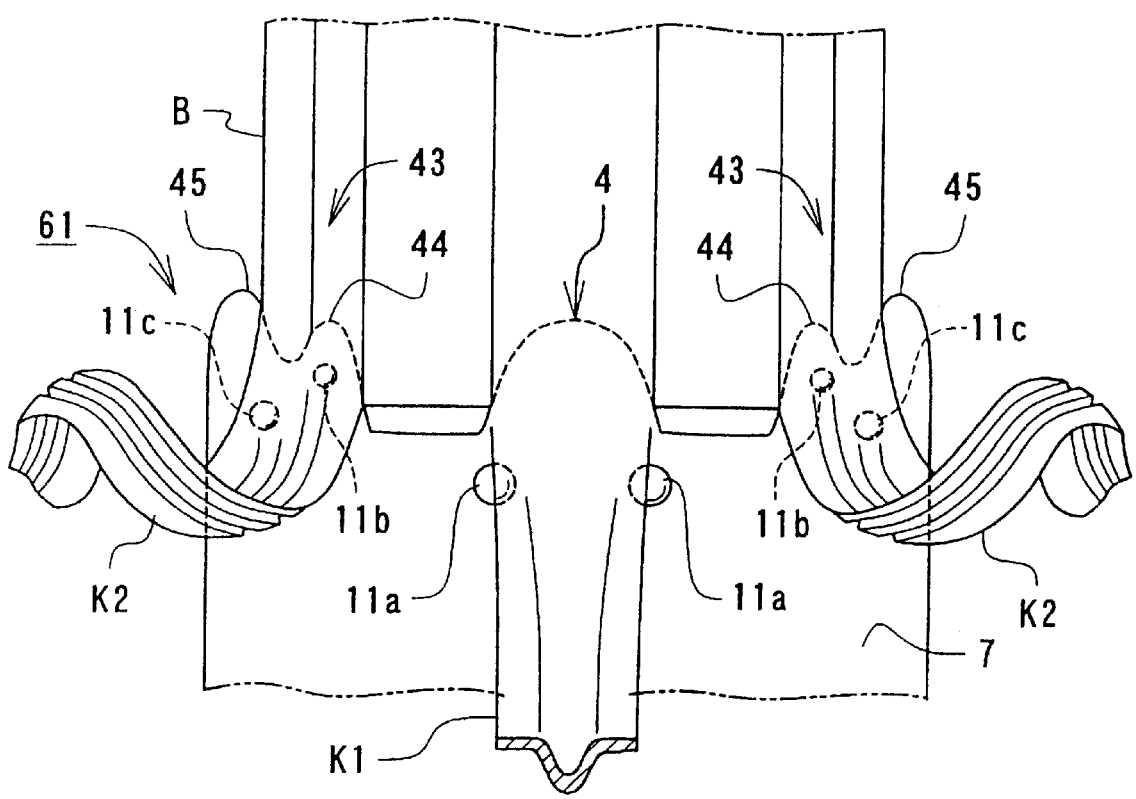
FIG. 14 is an enlarged plan view of an essential portion of the tip of FIG. 13, illustrating cutting of a raceway groove by means of the tip.

Sixth Embodiment:

A tip 61 according to a sixth embodiment of the present invention will next be described with reference to FIGS. 13 and 14. In contrast to the above-described tips which are adapted to cut a raceway groove or a seal groove in a bearing race, the tip 61 is a composite tip including a racewaygroove-cutting edge 4, which is disposed at the lateral center, and seal-groove-cutting edges 44 and chamfering edges 45, which are disposed at opposite sides of the raceway-groove-cutting edge 4 in a symmetrical manner. Two protrusions 11a corresponding to the raceway-groove-cutting edge 4 are disposed in a laterally symmetrical manner. Two protrusions 11b corresponding to the two seal-groove-cutting edges 44 are disposed in a laterally symmetrical manner, and two protrusions 11c corresponding to the two chamfering edges 45 are disposed in a laterally symmetrical manner. Further, the left-hand and right-hand protrusions 11b and 11c are disposed in a rearwardly fanning-out manner as viewed from above.

In cutting by means of the tip 61, a chip K1 produced through cutting of a raceway groove is deformed by means of the central protrusions 11a such that its cross section assumes a corrugated form, and is curled into a spiral form while being ejected straight rearward. At the same time, right- and left-hand chips K2 produced through cutting of seal grooves are deformed by means of the right- and left-hand protrusions 11b and 11c such that their cross section assumes a corrugated form, and are ejected rearward in an outwardly slanted direction, in the form of a coil. That is, in cutting by means of the tip 61, three columns of chips K1 and K2 are ejected. The central chip K1 produced through cutting by means of the central raceway-groove-cutting edge 4 is curled into a spiral form without extending straight in an elongate manner. The right- and left-hand chips K2 produced through cutting of seal grooves are ejected rearward in rightward and leftward, outwardly slanted directions, respectively, along the corresponding slants defined by the protrusions 11b and 11c. Thus, in contrast to cutting by means of a conventional tip in which a plurality of chips become entangled with each other in a complicated manner to assume the form of a bird's nest, cutting by means of the tip 61 does not involve such a problem, thereby preventing undesired stoppage of a machine.

A plunge-cutting forming tip according to the present invention has been described while mentioning a tip for cutting a raceway groove in a bearing race, a tip for cutting a seal groove in the bearing race, and a tip for chamfering the bearing race. However, the present invention is not limited thereto. The present invention may be embodied in the form of a tip having a cutting edge corresponding to a workpiece without departing from the spirit of the present invention. The present invention may also be embodied in a form other than a throwaway tip.

As described above, in cutting by means of the plunge-cutting forming tip of the present invention, a chip is ejected which is not only merely thin, but also is ejected in such a manner as to be partially squeezed as a result of pressing against a protrusion. Accordingly, the chip is ejected such that a cross section thereof is deformed into a channel shape or corrugated shape instead of assuming a flat shape. Thus, the rigidity of the chip is increased, so that chip disposal is improved accordingly. When the chip is ejected straight rearward, the chip is curled on a rake face into a spiral form, thereby reducing volume thereof. Even when the chip is ejected rearward in a slanted direction, the chip is less likely to weave about, thereby facilitating chip disposal.

This application is based on Japanese Patent Application No. Hei. 11-84788 filed Mar. 26, 1999 which is incorporated herein by reference in its entirety.

What is claimed is:

1. A cutting tip for cutting a bearing race comprising: a rake face; a cutting edge, said cutting edge having a ridgeline and comprising an arcuate cutting edge and first and second linear cutting edges arranged on opposite sides of the arcuate cutting edge; and a total of two edge corners, wherein said cutting tip further comprises a protrusion having a width from 0.2 mm to 2 mm disposed on said rake face within 2 mm of said ridgeline, and the arcuate cutting edge is a raceway-groove-cutting edge for cutting a raceway groove in a bearing race.

2. A cutting tip for cutting a bearing race comprising: a rake face; and a cutting edge, said cutting edge having a ridgeline and comprising an arcuate cutting edge and first and second linear cutting edges arranged on opposite sides of the arcuate cutting edge; and a total of two edge corners, wherein said cutting tip further comprises a plurality of protrusions disposed on said rake face each within 2 mm of said ridgeline, at least one of the protrusions having a width of from 0.2 to 2 mm, and the arcuate cutting edge is a raceway-groove-cutting edge for cutting a raceway groove in a bearing race.

3. The cutting tip according to claim 2, wherein the protrusions are disposed on the rake face in a laterally symmetrical manner.

4. The cutting tip according to claim 2, wherein the protrusions are disposed on the rake face in a laterally asymmetrical manner.

5. The cutting tip according to claim 1, wherein the cutting edge further comprises first and second seal-groove-cutting edges for cutting a seal groove in a bearing race, said first and second seal-groove cutting edges being arranged on opposite sides of said first and second linear cutting edges.

6. The cutting tip according to claim 2, wherein the cutting edge further comprises first and second seal-groove-cutting edges for cutting a seal groove in a bearing race, said first and second seal-groove cutting edges being arranged on opposite sides of said first and second linear cutting edges.

7. The cutting tip according to claim 1, wherein the cutting edge comprises a raceway-groove-cutting edge for cutting a raceway groove in a bearing race and a seal-groove-cutting edge for cutting a seal groove in the bearing race.

8. The cutting tip according to claim 2, wherein the cutting edge comprises a raceway-groove-cutting edge for cutting a raceway groove in a bearing race and a seal-groove-cutting edge for cutting a seal groove in the bearing race.

9. The cutting tip according to claim 1, wherein the distance between said cutting edge and the protrusion is in the range of from 0.1 to 1 mm.

10. The cutting tip according to claim 2, wherein the distance between said cutting edge and each protrusion is in the range of from 0.1 to 1 mm.

11. The cutting tip according to claim 1, wherein the protrusion is substantially hemispherical.

12. The cutting tip according to claim 2, wherein at least one protrusion is substantially hemispherical.

13. The cutting tip according to claim 1, wherein the protrusion is in the form of a peninsula extending toward said cutting edge.

14. The cutting tip according to claim 2, wherein at least one protrusion is in the form of a peninsula extending toward said cutting edge.

15. The cutting tip according to claim 2, wherein at least one protrusion is disposed rearwardly of at least another protrusion, and wherein the height of said rearward protrusion is greater than the height of said another protrusion.

16. The cutting tip according to claim 1, wherein said first and second linear cutting edges are arranged along a straight line and the arcuate cutting edge protrudes beyond the first and second linear cutting edges, said first and second cutting edges being adapted to cut circumferencial surfaces of said bearing race.

17. The cutting tip according to claim 2, wherein said first and second linear cutting edges are arranged along a straight line and the arcuate cutting edge protrudes beyond the first and second linear cutting edges, said first and second cutting edges being adopted to cut circumferencial surfaces of said bearing race.

18. The cutting edge according to claim 5, wherein the cutting edge further comprises first and second chamfering edges arranged on opposite sides of the first and second seal-groove-cutting edges.

19. The cutting edge according to claim 6, wherein the cutting edge further comprises first and second chamfering edges arranged on opposite sides of the first and second seal-groove-cutting edges.

\* \* \* \* \*